(12) United States Patent
Majumdar et al.

(10) Patent No.: US 9,168,490 B2
(45) Date of Patent: Oct. 27, 2015

(54) COMBINATION MEMBRANE SYSTEM FOR PRODUCING NITROGEN ENRICHED AIR

(75) Inventors: Sudipto Majumdar, Newark, DE (US); Kenneth J. Pennisi, Bear, DE (US); Donald J. Stookey, Chesterfield, MO (US)

(73) Assignee: CMS TECHNOLOGIES HOLDINGS, INC., Newport, DE (US)

( * ) Notice: Subject to any disclaimer, the term of this patent is extended or adjusted under 35 U.S.C. 154(b) by 265 days.

(21) Appl. No.: 13/585,040

(22) Filed: Aug. 14, 2012

(65) Prior Publication Data

US 2013/0042755 A1    Feb. 21, 2013

Related U.S. Application Data

(60) Provisional application No. 61/523,721, filed on Aug. 15, 2011.

(51) Int. Cl.
*B01D 53/22* (2006.01)
*B01D 69/02* (2006.01)
*C01B 21/04* (2006.01)

(52) U.S. Cl.
CPC .............. *B01D 53/226* (2013.01); *B01D 69/02* (2013.01); *C01B 21/0438* (2013.01); *B01D 2256/10* (2013.01); *B01D 2257/104* (2013.01); *B01D 2311/13* (2013.01); *B01D 2317/022* (2013.01); *B01D 2325/20* (2013.01); *C01B 2210/0045* (2013.01)

(58) Field of Classification Search
CPC .... B01D 53/22; B01D 53/226; B01D 53/228; B01D 71/64; B01D 2257/104; B01D 2256/10; B01D 2325/20; B01D 2317/022; B01D 2319/022; B01D 2311/13; B01D 69/02; C01B 2210/0045; C01B 21/0438
USPC ........................................................ 95/47, 54
See application file for complete search history.

(56) References Cited

U.S. PATENT DOCUMENTS

| | | | |
|---|---|---|---|
| 4,180,388 A | 12/1979 | Graham et al. |
| 4,687,578 A | 8/1987 | Stookey |
| 5,051,114 A | 9/1991 | Nemser et al. |

(Continued)

OTHER PUBLICATIONS

"module" <http://www.thefreedictionary.com/p/module> Retrived Oct. 27, 2014.*

(Continued)

*Primary Examiner* — Jason M Greene
*Assistant Examiner* — Anthony Shumate
(74) *Attorney, Agent, or Firm* — Jeffrey C. Lew

(57) ABSTRACT

A system for providing nitrogen enriched air (NEA) from ambient air uses at least two gas separation membranes that are selectively gas permeable for oxygen and nitrogen. The oxygen/nitrogen selectivity and oxygen permeance of two of the membranes are different such that (1) the selectivity of first membrane is less than the second membrane and the oxygen permeance of first membrane is greater than the second membrane, or (2) the selectivity of first membrane is greater than the second membrane and the oxygen permeance of first membrane is less than the second membrane. The system is very compact, is energy efficient, and highly effective for generating NEA. It is ideally suited for mobile, remote and specialized end use applications, such as automotive vehicles, marine vessels, off-shore platform fuel storage and especially for supplying NEA to blanket ullage of onboard aircraft fuel storage tanks.

7 Claims, 4 Drawing Sheets

(56) References Cited

U.S. PATENT DOCUMENTS

| | | | |
|---|---|---|---|
| 5,102,432 A | 4/1992 | Prasad | |
| 6,035,641 A * | 3/2000 | Lokhandwala | 60/649 |
| 6,180,168 B1 | 1/2001 | Stookey et al. | |
| 6,755,975 B2 | 6/2004 | Vane et al. | |
| 8,710,173 B2 * | 4/2014 | Liu et al. | 528/310 |
| 2004/0004040 A1 * | 1/2004 | Colling et al. | 210/641 |
| 2008/0167512 A1 * | 7/2008 | Sanders et al. | 585/818 |
| 2010/0212501 A1 * | 8/2010 | Peters et al. | 96/8 |
| 2011/0077446 A1 * | 3/2011 | Shanbhag et al. | 585/818 |
| 2011/0094379 A1 * | 4/2011 | Cordatos | 95/51 |
| 2011/0114547 A1 * | 5/2011 | Sanders et al. | 210/180 |
| 2011/0305310 A1 * | 12/2011 | Sanchez et al. | 376/383 |
| 2012/0055385 A1 * | 3/2012 | Lien et al. | 110/345 |
| 2012/0085232 A1 * | 4/2012 | Sethna et al. | 95/41 |
| 2012/0322646 A1 * | 12/2012 | Liu et al. | 502/4 |
| 2013/0108531 A1 * | 5/2013 | Mitariten | 423/219 |
| 2014/0243572 A1 * | 8/2014 | Straub et al. | 585/802 |

OTHER PUBLICATIONS

Roman, Ian C., Membranes for Nitrogen Generation: Recent Advances and Impact on Other Gas Separations, Seminar Presentation, Ecological Applications fo Innovative Membrane Technology in the Chemical Industry, United Nations Economic Commission for Europe, Centraro, Italy, May, 1996.

Roman, Ian C. How Do You Coax 99+% Nitrogen from Membranes?, Presentation Membrane Technology and Separation Planning Conference, Newton, MA, Oct. 23-25, 1995.

* cited by examiner

COMBINATION MEMBRANE SYSTEM FOR PRODUCING NITROGEN ENRICHED AIR

This application claims the benefit of U.S. Provisional Application No. 61/523,721 filed Aug. 15, 2011.

Support was provided under Environmental Protection Agency grant 68-D6-0042. The U.S. government has rights in this patent application.

FIELD OF THE INVENTION

This invention relates to a membrane separation system for generating nitrogen enriched air. More specifically, it relates to a light weight, compact system having multiple selectively gas permeable membranes adapted to produce nitrogen enriched air and suitable for space- and weight-constrained utilities such as blanketing of aircraft fuel tanks.

BACKGROUND OF THE INVENTION

Air is a gas mixture comprising about 21 mol % oxygen, about 79 mol % nitrogen and very small amounts of other components such as carbon dioxide, argon and the like. The separation of air to provide oxygen enriched air (OEA) and/or nitrogen enriched air (NEA) is commercially significant. For example, one use of NEA is to provide an inert gas composition in the ullage of mobile fuel tanks, especially aircraft fuel tanks. Such tanks typically contain highly combustible liquid fuels of volatile organic compositions. Raising nitrogen concentration in the ullage sufficiently high can render the vapor above the liquid fuel in a fuel storage tank safely non-combustible. Nitrogen concentration can be effectively raised by displacing any ambient air in the tank with a suitable NEA.

Selectively gas permeable membranes are useful for separating components of gas mixtures. Membrane separation has been used to produce OEA and/or NEA from ambient air. Certain fluorinated composition membranes have been found effective for separating ambient air. A representative example of such a membrane has a nonporous selectively gas permeable layer of perfluorinated dioxole monomer, namely perfluoro-2,2-dimethyl-1,3-dioxole ("PDD") copolymerized with another fluorine containing monomer such as tetrafluoroethylene ("TFE"). Such membranes are available from Compact Membrane Systems, Inc., Newport, Del. An example of a membrane separation process for separating air is disclosed in U.S. Pat. No. 5,051,114. The complete disclosure of all U.S. patents and patent applications identified in the present patent application are hereby incorporated herein by reference.

The separation performance of gas permeable membranes is typically characterized by two principal parameters, namely, the selectivity of the membrane to discriminate between components of a binary feed mixture being separated, and the permeability of the faster permeating component. Usually such membranes exhibit high selectivity with low permeability, or low selectivity with high permeability. In this disclosure reference will be made to permeance. Permeance is permeability divided by the thickness of a membrane.

The trade-off between selectivity and permeance influences the size and operating conditions necessary to achieve desired separation. For example, to obtain highly $N_2$-enriched air at a specified volumetric rate, a very selective membrane can be used. However, the permeance of the fast-migrating component will be relatively low such that production rate is likely slower than desired. This problem can be overcome by increasing the working area of the membrane. In mobile end use applications and particularly for aircraft, size and weight have critical upper limits such that large membrane separators can be unacceptable. Similarly, smaller membranes with higher permeance can be used but enrichment per separation step is relatively low. This problem can be overcome by utilizing a train of separator steps or stages such that enrichment increases in successive steps. The drawback is that many steps or stages and auxiliary equipment, such as compressors with associated power supplies may be needed. The weight and space for the extra equipment and multiple membrane units can be prohibitive.

It is desirable to have a selectively gas permeable membrane separation system for producing NEA from ambient air that is very light weight. It is desired to have a membrane separation system that occupies a small volume and is simple to operate. There is great need for a light weight, compact, energy conserving and reliable membrane separation system suitable for generating NEA to provide inert atmosphere in the ullage of mobile tanks of volatile organic compounds, and especially of onboard fuel tanks of aircraft.

SUMMARY OF THE INVENTION

A multiple-module system for providing nitrogen enriched air (NEA) from ambient air uses two different gas separation membranes that both have higher selectivity for oxygen than for nitrogen. Also, the oxygen/nitrogen selectivity and oxygen permeance of the membranes in two of the modules are such that (1) the selectivity of the first membrane is less than the second membrane and the oxygen permeance of the first membrane is greater than the second membrane, or (2) the selectivity of the first membrane is greater than the second membrane and the oxygen permeance of the first membrane is less than the second membrane. The system is very compact, is energy efficient, and highly effective for generating NEA. It is ideally suited for mobile, remote and specialized end use applications, such as supplying NEA for blanketing ullage of onboard aircraft fuel storage tanks.

DETAILED DESCRIPTION OF THE INVENTION

In this disclosure the term "membrane" refers to a component that is capable of performing selective separation of a mixture. The membrane can be an individual membrane element, such as a flat film or a hollow fiber, for example, or it can be a group of such common elements assembled and manipulated together in a unit occasionally referred to as a cartridge. Single membrane elements, multiple individual membrane elements, or one or more cartridges are typically installed together within cases, known as modules, with common process stream ports. A practical process can use one or more membranes in each of one or more modules to carry out steps of a separation.

Figure 1:
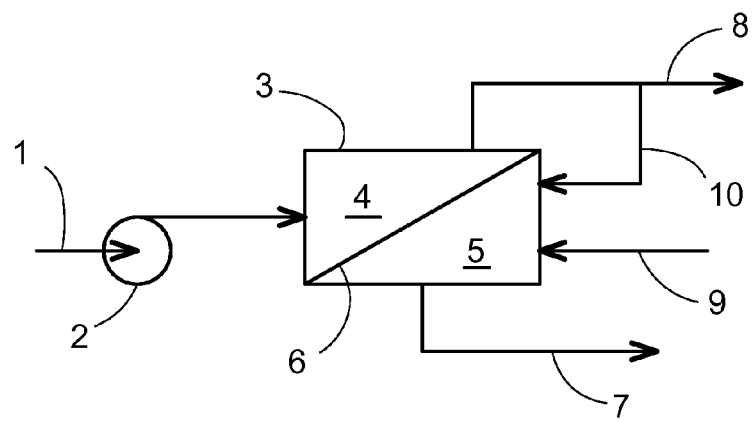
FIG. 1 is a schematic flow diagram illustrating an embodiment of a traditional, single step membrane separation process for producing nitrogen enriched air.

The basic, single step membrane separation process seen in FIG. 1 includes a membrane module 3 containing a selectively gas permeable membrane 6. The membrane can have any of many forms well known in the membrane separation arts, for example such as flat sheet membrane, spiral wound membrane, ribbon tube membrane and hollow fiber membrane, with the module having a correspondingly suitable shape. In general, the membrane divides the module into two internal chambers, namely, a feed-retentate chamber 4 and a permeate chamber 5, each being in contact with opposite sides of the membrane 6. There can be more than a single membrane element with the module, however, all such membrane elements are in a parallel flow configuration with respect to feed stream 1, permeate stream 7, and retentate stream 8. For simplicity, all membrane elements within a single module will be referenced collectively as a "membrane" for purposes of this description.

The membrane employed in this invention is of such composition that both oxygen and nitrogen permeate the membrane, but oxygen preferentially permeates relative to nitrogen. Each membrane is characterized by its selectivity between two components of a mixture to be separated, sometimes identified by the symbol, $\alpha$. This disclosure adopts the convention that the term "selectivity" in context of separation of oxygen and nitrogen gas mixtures means the value of the permeance through the membrane of pure component oxygen divided by the permeance through the membrane of pure component nitrogen. Such membranes are also characterized by the oxygen permeance.

A feed stream 1 of air to be separated to produce a nitrogen enriched air ("NEA") product is charged at a high pressure into the feed-retentate chamber 4 by compressor 2. The pressure of the feed is high enough to force the feed into module 3 and to cause permeation of the components to selectively permeate through the membrane 6. Selective permeation of air through the membrane results in the permeate stream 7 being enriched in oxygen and the retentate stream 8 being enriched in nitrogen.

In a basic embodiment of the conventional process, all of the permeate stream 7 containing predominantly faster permeating oxygen, is withdrawn as oxygen enriched air ("OEA") byproduct. The residual gas stream on the feed-retentate side of the membrane being depleted in oxygen provides the desired product NEA. All of the retentate stream from chamber 4 is removed as NEA.

In another embodiment, an optional stream 9 of ambient air is charged into the permeate chamber 5. This stream is occasionally referred to as a "sweep" stream. A suitable fan or compressor, not shown, can be used to motivate the sweep stream. The sweep stream can improve performance of a given membrane separation step in any of different ways. For one, the sweep composition of this embodiment is air at ambient concentration. It thus increases the nitrogen concentration of the OEA on the permeate side of the membrane, thereby increasing the concentration driving force for permeation of oxygen and reducing the driving force for permeation of nitrogen through the membrane. In another aspect, the physical force of the sweep stream can agitate the gas within the permeate chamber to reduce stagnant regions near the membrane surface and thereby make greater use of area of the membrane for selective permeation. Using a sweep stream of ambient air can produce a higher concentration of nitrogen in product NEA than a non-swept module at the same operating conditions.

In still another embodiment, a portion of the product NEA stream 8 can optionally be returned to the permeate chamber 5 as a sweep stream 10. The function of product sweep stream 10 is similar to that of ambient air sweep stream 9. The difference is that stream 10 is a NEA gas composition having higher nitrogen concentration than ambient air. Consequently, the oxygen dilution effect in the permeate chamber is enhanced relative to use of ambient air for the sweep stream. An accepted drawback is that a fraction of the useful product is lost as the sweep stream. The benefit is that a given module with sweep can produce a higher concentration of nitrogen in the NEA product than otherwise would occur.

Figure 2:
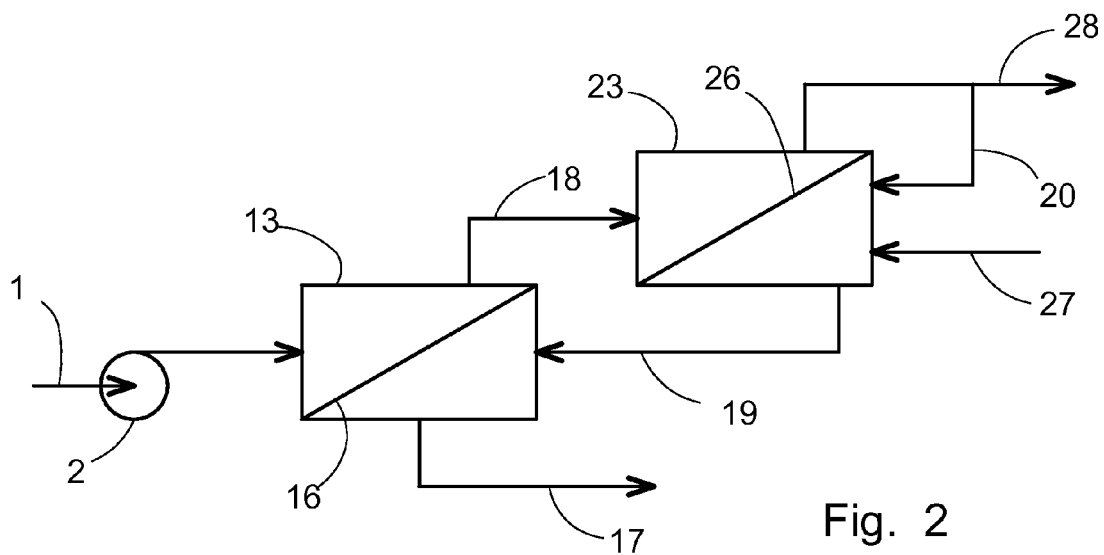
FIG. 2 is a schematic flow diagram illustrating an embodiment of a dual step, combination membrane separation process for producing nitrogen enriched air according to the present invention.

FIG. 2 illustrates different embodiments of a novel process for producing NEA from air using two steps of membrane separation with the following flow configurations. Feed air stream 1 is forced by compressor 2 into first step module 13 that has a first selectively gas permeable membrane 16. An OEA permeate stream 17 is removed from this module as a byproduct and intermediate product 18 enriched in nitrogen relative to ambient air is diverted into the feed-retentate chamber of second step module 23. This module has a second selectively gas permeable membrane 26. Pressure of intermediate stream 18 is sufficiently high to permeate through second membrane 26 and thereby provides additional removal of oxygen via permeate stream 19 and further increase of concentration of nitrogen in ultimate NEA product stream 28. Permeate stream 19 also having higher nitrogen concentration than ambient air, can be returned to the first step module permeate chamber as a sweep stream. In this embodiment of the process, all of stream 28 is drawn as product and no sweep of the permeate chamber of the second step module 23 is employed. In another embodiment, ambient air 27 can be used to sweep the permeate chamber of the second step module. In yet another embodiment, a portion 20 of product NEA stream 28 can be returned to the second step module permeate chamber as a sweep. It should be understood that use of air sweep, NEA stream sweep and a combination of air and NEA sweep are optional.

A main novel aspect of the process according to this invention is the relationship between the separation characteristics of the membranes in the different steps. Membrane 16 is characterized as having a first selectivity, $\alpha_1$, between oxygen and nitrogen and first oxygen permeance, "$f_1$". Similarly, membrane 26 has a second selectivity, $\alpha_2$, and a second oxygen permeance, "$f_2$". Importantly, $\alpha_1$ is different from $\alpha_2$ and $f_1$ is different from $f_2$. Being understood that oxygen preferentially permeates the membranes, that is permeates faster, than nitrogen, each of first selectivity, $\alpha_1$ and second selectivity, $\alpha_2$ is numerically greater than 1.0. Furthermore, the selectivity and oxygen permeance for the two steps should be such that either (1) $\alpha_1$ is less than $\alpha_2$, and $f_1$ is greater than $f_2$ or (2) $\alpha_1$ is greater than $\alpha_2$, and $f_1$ is less than $f_2$. Thus, in one preferred embodiment, the membrane of the first step has a lower selectivity and a higher oxygen permeance than the membrane of the second step. In another preferred embodiment, the membrane of the first step has a higher selectivity and a lower oxygen permeance than the membrane of the second step. Preferably, the difference between selectivities and oxygen permeance of the steps should be substantial. For example, the selectivity of the more highly selective membrane should be at least about 10%, more preferably at least about 20%, still more preferably at least about 50% and most preferably at least 100% greater than the selectivity of the less selective membrane. Similarly, the oxygen permeance of the higher oxygen permeance membrane should be at least about 10%, more preferably at least about 20%, still more preferably at least about 50% and most preferably at least 100% greater than the oxygen permeance of the lower oxygen permeance membrane.

Figure 3:
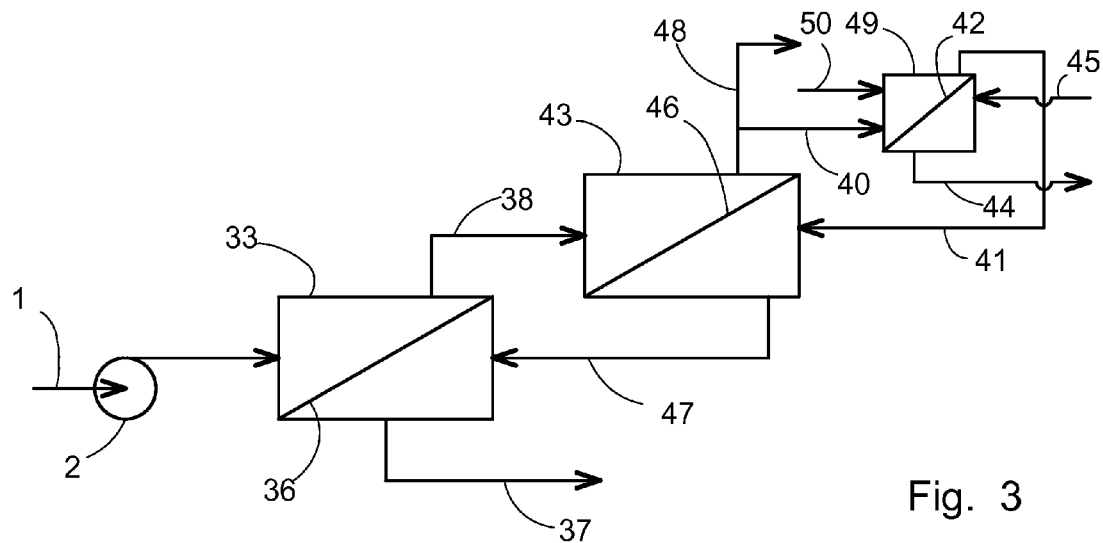
FIG. 3 is a schematic flow diagram illustrating another embodiment of a dual step, combination membrane separation process for producing nitrogen enriched air according to the present invention which incorporates a third, booster membrane module.

FIG. 3 illustrates another preferred embodiment in which the membrane 36 of the first step module 33 has a lower selectivity and higher oxygen permeance than the membrane 46 of the second step module 43. Nitrogen enriched retentate stream 38 from the first module feeds into the second module and first step permeate 37 is not used further by this process. Permeate 47 from the second step module is introduced into the permeate side of the first step module 33 and thereby sweeps and improves performance of membrane 36. A relatively small fraction 40 of the retentate stream from the second step module is charged as feed to a third module, so-called "booster" module 49. The primary function of the booster module is to provide a very highly nitrogen enriched retentate stream 41 that can be used as a sweep stream flow to the permeate side of membrane 46 in the second step module 43. That is, stream 41 has a higher nitrogen concentration than the main stream 48 of NEA retentate from the second step module that is the desired overall product of this process. Only a relatively small amount of the very highly enriched nitrogen retentate stream 41 is effective to boost the performance of the second step module. Therefore, the booster module 49 can have a smaller area membrane and module body than the first and second step modules. This is symbolically represented by the size of the box 49 in FIG. 3. Unless expressly indicated, drawings in this disclosure are not drawn to scale. In an alternate embodiment, an optional ambient air stream 50 can be fed to the feed-retentate chamber of booster module 49 in place of stream 40 to create nitrogen enriched retentate stream 41.

Booster module 49 utilizes a selectively permeable membrane 42. This membrane can have any value of selectivity and oxygen permeance relative to either membrane 36 of the first module 33 and membrane 46 of module 43. It is contemplated that better performance is obtained when booster module membrane 42 has respectively higher selectivity and lower oxygen permeance values than the first step module membrane 36. Generally, desired performance behavior of the novel process is to provide a suitably high nitrogen concentration, preferably greater than about 90 mole % $N_2$, in stream 48 produced at satisfactory flow rate. Preferably the process can be operated with acceptably low equipment weight, size and, more preferably with low energy consumption for a preselected end use application. Membrane 42 can be the same composition as or different from membrane 46. Optionally, an ambient air stream 45 can be used to sweep the permeate side of booster module 49.

Figure 4:
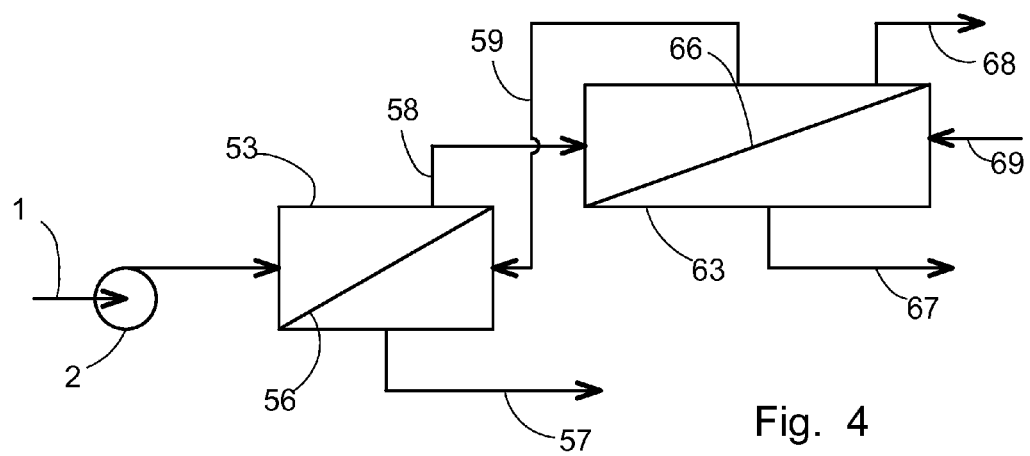
FIG. 4 is a schematic flow diagram illustrating another embodiment of a dual step, combination membrane separation process for producing nitrogen enriched air according to the present invention which uses nitrogen enriched air from an intermediate location of a downstream module to sweep the permeate side of an upstream module.

FIG. 4 shows another embodiment of this invention having similarities to that of FIG. 3. Air is fed into first step module 53 that has a membrane 56 and which produces nitrogen enriched retentate 58 and byproduct oxygen enriched air 57. Retentate stream 58 is fed to second step module 63 having membrane 66. Permeate 67 from the second step module is not further used by this process. Membrane 56 is chosen to provide lower selectivity and higher oxygen permeance respectively than membrane 66. Module 63 may be viewed as an integrated construct having the combined features of modules 43 and 49 (FIG. 3). At an intermediate point between feed inlet and product retentate 68 outlet, a sidestream 59 of somewhat enriched NEA is removed from the retentate chamber of the second step module and returned as a sweep flow to the permeate side of module 53. Optionally, an ambient air stream 69 can be used to sweep the permeate side of second step module 63. The nitrogen concentration of the sidestream 59 is lower than that of product stream 68, however, it is sufficiently high to improve the separation performance of membrane 56 in the first step module. Second step module 63 can be larger as shown symbolically in FIG. 4, than second step module 43 (FIG. 3) for equivalent production parameters. However, the system of FIG. 4 advantageously presents the possibility of economies, especially in number of parts, connections, maintenance and total weight.

Figure 5:
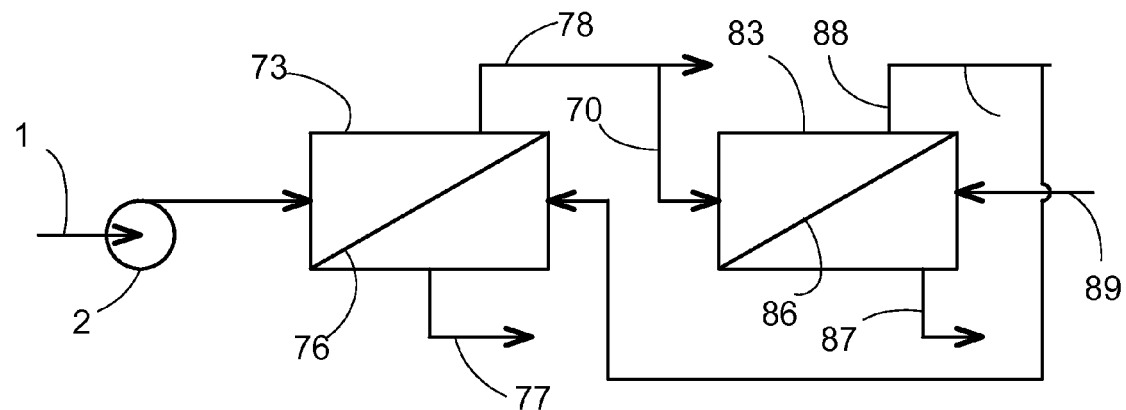
FIG. 5 is a schematic flow diagram illustrating another embodiment of a dual step, combination membrane separation process for producing nitrogen enriched air according to the present invention in which a downstream module provides nitrogen enriched air for a sweep of the permeate side of an upstream module.

FIG. 5 illustrates another embodiment that also bears configurational similarities to those of the system shown in FIG. 3. Air 1 is fed by compressor 2 into a first step module 73 having selectively permeable membrane 76. Retentate stream 78 from the first step module is the desired product of NEA. A fraction 70 of retentate stream 78 is charged as a feed to second module 83 equipped with selectively permeable membrane 86. Membrane 76 is chosen to provide lower selectivity and higher oxygen permeance respectively than membrane 86. Nitrogen enriched retentate 88 is withdrawn from the second step module and returned to the low pressure side of the first step module 73 as a sweep flow. Permeate flows 77 and 87 from the first and second step modules, respectively, are not further used by this process. Optionally, an ambient air stream 89 can be used to sweep the permeate side of second step module 83. In this embodiment the second step module performs similarly to the booster step module of FIG. 3 by producing highly enriched NEA retentate. That second step retentate as a sweep flow enhances performance of the first step effectively to generate the desired NEA product in the first step module.

Figure 6:
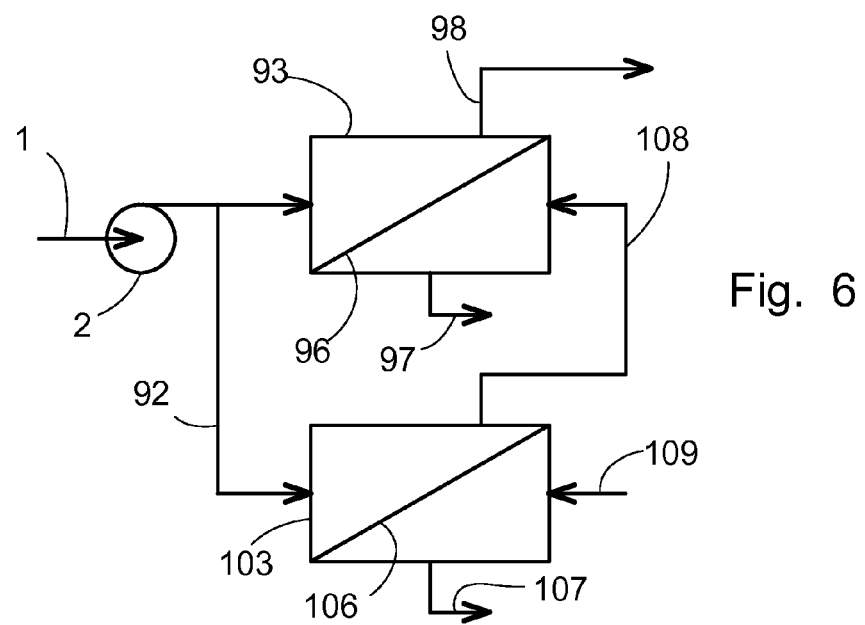
FIG. 6 is a schematic flow diagram illustrating another embodiment of a dual step, combination membrane separation process for producing nitrogen enriched air according to the present invention which uses a secondary membrane in parallel with a primary membrane to provide nitrogen enriched air for a sweep of the permeate side of the primary membrane.

FIG. 6 shows another embodiment of the novel NEA production process. Feed air 1 is supplied through compressor 2 to first module 93 having selectively permeable membrane 96. Similarly to the embodiment of FIG. 5, this first step module provides a retentate stream 98 that has the desired concentration of product NEA. A stream 92 that is a fraction of the compressed feed air 1 is charged to second step module 103 containing selectively permeable membrane 106. Membrane 96 is chosen to provide lower selectivity and higher oxygen permeance respectively than membrane 106. Thus the two "steps" in this process configuration may be construed in a sense as operating in parallel. High pressure retentate 108 from the second step has an enriched concentration of nitrogen relative to the feed air. It is returned to the permeate side of the first step module 93 to serve as a sweep flow. Sweep enhances performance of the first step module effectively to provide first step retentate 98 of desired flow and concentration. The permeate streams 97 and 107 from first and second step modules, respectively, are not used further in this process. Optionally, an ambient air stream 109 can be used to sweep the permeate side of second step module 106.

The novel combination module system for producing NEA has many potential utilities. Preferably, it can be used to provide a blanket of inert gas in the ullage of aircraft onboard storage tanks that contain flammable, highly volatile liquid organic compounds. Other utilities in which compactness, low weight, portability and accessibility constraints apply are also contemplated. These include, fuel or other volatile combustible liquid storage facilities for use in combustion engine-motivated vehicles, such as automobiles, trucks and the like, marine vessels. Other contemplated potential utilities where the novel membrane separation system can be used to efficiently generate nitrogen enriched air include off-shore natural resource recovery facilities, such as oil and gas drilling platforms where space is limited, and on-shore industrial production apparatus installations, especially in remote, difficult-to-access locations, such as in the Arctic or desert regions, to name a few. Representative examples of these include mineral, oil and natural gas drilling and production facilities, food and beverage processing facilities, and industrial chemical processing facilities.

In the end use application of blanketing flammable and volatile liquids in onboard aircraft storage tanks, mainly weight, and to a lesser but still important degree, size of the NEA production unit is particularly important. Weight is a critical design parameter because the aircraft must provide lift capacity effective to carry the NEA production unit in addition to the aircraft existing base weight and payload weight. Moreover, the heavier an aircraft, the more fuel it must consume to maintain flight. Generally, the larger the area of a membrane separator, the larger will be its size and weight. Size is usually very important because the available volume to stow gear on an aircraft is finite and thus limited. Preferably, the NEA production unit should occupy as little space as possible thereby freeing more onboard space for other uses. Other parameters understood to be important include the additional energy consumption required to operate the NEA production unit above and beyond that needed to operate the aircraft and its other auxiliary systems. The method of sourcing energy to drive the NEA production unit depends greatly on the type of aircraft concerned. For purposes of this disclosure, size and weight of the NEA production unit are contemplated as being the paramount design considerations for onboard aircraft fuel tank blanketing end use applications.

EXAMPLES

This invention is now illustrated by examples of certain representative embodiments thereof. All units of weight and measure not originally obtained in SI units have been converted to SI units. In the examples, the term The entire disclosures of U.S. patents and applications identified in this disclosure are hereby incorporated in their entirety by reference herein.

Comparative Example 1

Single, High Selectivity-Low Flux Membrane Performance

Simulate generation of nitrogen enriched air (NEA) from ambient air (i.e., ~79 mole % nitrogen/~21 mole % oxygen) in a single step, high oxygen/nitrogen selectivity, low permeance membrane model with the following conditions. The model membrane system is the same as shown in FIG. 1 but without external ambient air sweep stream 9. The membrane separator 3 is a module of 608,000 selectively gas permeable membrane hollow fibers having oxygen-to-nitrogen selectivity of 6 and oxygen permeance of 39.9 gas permeation units (GPU). One GPU equals $1\times10^{-6}$ cm$^3$ at standard temperature and pressure per cm$^2$ per s per cm Hg), The fibers are each 44.8 cm long, are 1.016 mm in outer diameter and provide a total effective membrane surface area for permeation of 870 m$^2$ (9,370 ft$^2$).

A feed of 3.51 m$^3$/min. at standard conditions (124 standard cubic feet/min. "scfm") of ambient air flows to the module inlet manifold into the cores of the fibers by force of compressor 2 at a pressure of 414 kPa. Oxygen enriched air (OEA) of 1.24 m$^3$/min. (43.7 scfm) permeates from the bore, through the fiber membranes to the shell side of the module and discharges to atmosphere. The module generates 2.27 m$^3$/min. (80.3 scfm) NEA retentate of 90 mole % nitrogen from the module discharge manifold. A sweep flow of 0.113 m$^3$/min. (4.0 scfm) of the NEA returns to the shell side of the module. Thus the module produces a net of 2.16 m$^3$/min. (76.3 scfm) NEA.

This example illustrates that for given product specifications, the productivity (i.e., net NEA flow as percent of feed flow) for a comparatively high selectivity/low permeance membrane module is 61.5% and the membrane area per unit of product flow is 403 m$^2$ per m$^3$/min (123 ft$^2$/scfm).

Comparative Example 2

Single, Low Selectivity-High Permeance Membrane Performance

Simulate generation of nitrogen enriched air (NEA) from ambient air in a single step, low selectivity membrane, high permeance model with the following conditions. The model membrane system has the same process flow configuration as Comp. Ex. 1. The membrane separator 3 is a module of 53,300 selectively gas permeable hollow membrane hollow fibers having oxygen-to-nitrogen selectivity of 2.2 and oxygent permeance of 800 GPU. The fibers have the same dimensions as in Comp. Ex. 1. The module thus provides a total effective membrane surface area for permeation of 76.2 m$^2$ (820 ft$^2$).

Adjust feed flow and sweep flow to simulate generation of the same concentration and net production rate, that is, 2.16 m$^3$/min. (76.3 scfm) of 90 mole % nitrogen NEA, as in Comp. Ex. 1. Determine the ambient air feed to the module to be 6.94 m$^3$/min. at standard conditions (245 scfm) at a pressure of 414 kPa. Oxygen enriched air (OEA) of 4.55 m$^3$/min. (160.8 scfm) permeates from the bore, through the fiber to the shell side of the module and discharges to atmosphere. The module generates 2.38 m$^3$/min. (84.2 scfm) NEA retentate of 90 mole % nitrogen from the module discharge manifold including a sweep flow of 0.22 m$^3$/min. (7.9 scfm) of the NEA that returns to the shell side of the module.

This example illustrates that for given product specifications, the productivity for a comparatively low selectivity/high permeance membrane module is 31.2% and the membrane area per unit of product flow is 35.3 m$^2$ per m$^3$/min. (10.7 ft$^2$/scfm).

Example 3

Two-Step Separation with Low Selectivity-High Permeance Module First

Figure 7:
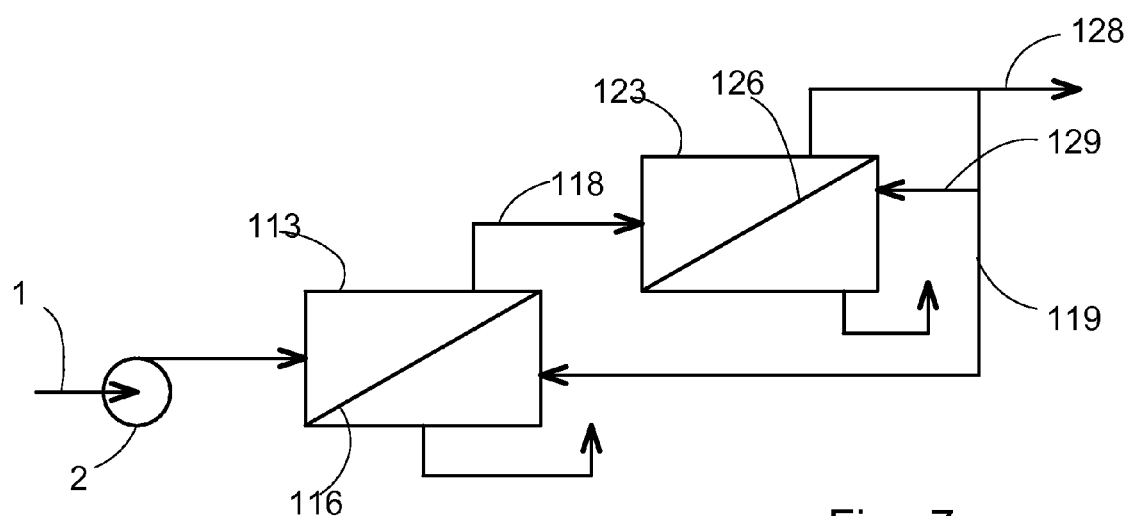
FIG. 7 is a schematic flow diagram illustrating another embodiment of a dual step combination membrane separation process for producing nitrogen enriched air according to the present invention, in which nitrogen enriched air from a downstream module provides sweep of the permeate sides of the downstream module and an upstream module.

Simulate according to the following conditions the generation of nitrogen enriched air (NEA) from ambient air in a two-step membrane separation process configured as shown in FIG. 7. The first step module 113 utilizes a low selectivity and high permeance model membrane 116, and the second step module 123 utilizes a high selectivity/low permeance model membrane 126. Feed pressure for first step module 113 is 414 kPa and pressure on the permeate side is 101 kPa. Retentate 118 enters the second step module at 412 kPa with second step permeate side pressure of 101 kPa. The permeate of both steps can discharge to atmosphere. Product NEA is stream 128 from the second step retentate side of membrane 126. The second step membrane retentate splits to also provide sweep streams 119 and 129 to both first step and second step modules, respectively. In this example the flow rates of sweep streams 119 and 129 are equal. Equal split of the sweep stream as in this example is not essential to the function of the invention.

The first step membrane separator 113 is a module of 21,200 of the same selectively gas permeable membrane hollow fibers as in Comp. Ex. 2 and provide a total effective membrane surface area for permeation of 30.3 m² (326 ft²). The second step membrane separator 123 is a module of 362,000 of the same selectively gas permeable membrane hollow fibers as in Comp. Ex. 1 and provide a total effective membrane surface area for permeation of 518 m² (5,570 ft²).

Adjust feed flow and sweep flows to simulate generation of the same concentration and net production rate, that is, 2.16 m³/min. (76.3 scfm) of 90 mole % nitrogen NEA, as in Comp. Ex. 1. Determine the ambient air feed to the module to be 4.84 m³/min. at standard conditions (171 scfm). Total oxygen enriched air (OEA) of 2.52 m³/min. (89.1 scfm) permeates from the bore, through the membranes to the shell side of the first step and second step modules and discharges to atmosphere. The combined modules generate 2.32 m³/min. (81.8 scfm) NEA retentate of 90 mole % nitrogen from the module discharge manifold including a total sweep flow of 0.156 m³/min. (5.5 scfm) of the NEA. Half of the total sweep returns to the shell side of each of the first step and second step modules.

This example illustrates that for given product specifications of the combined module configuration, the overall productivity is 44.7% and the total membrane area per unit of product flow of the two modules is 254 m² per m³/min. of product flow (77.3 ft²/scfm).

Example 4

Two-Step Separation with Low Selectivity-High Permeance Module First

Repeat Ex. 3 with membranes of same composition and dimensions as in first step and second step modules, respectively, but with different size modules containing different numbers of fibers. Membrane area of the first step module 113 with low selectivity/high permeance membrane fibers is 48.0 m² (517 ft²), and membrane area of the second step module 123 with high selectivity/low permeance membranes is 296 m² (3,190 ft²). This example shows that the overall productivity is 38.5% and total membrane area per unit of product flow of the two modules is 159 m² per m³/min. of product flow (48.5 ft²/scfm).

Simulation result data for each of the above examples is presented in Table 1. For each example, the product was 2.16 m³/min. (76.3 scfm) of NEA containing 90 mole % nitrogen. The tabulated data indicates that an extremely large surface area high selectivity/low permeance membrane or a comparatively much smaller single high selectivity/low permeance membrane can each alone generate the goal NEA composition. However, the low selectivity/high permeance membrane has about half the productivity of the high selectivity/low permeance membrane and thus needs to process about twice as much feed air. By using only a small fraction (0.06) of the total area for a low selectivity/high permeance membrane as a first step in a two-step separation process (Ex. 3), the total area required to achieve the same product NEA flow and concentration drops to 37.0% of the high selectivity/low permeance membrane alone. Additionally, this two-step process provides a small (27.5%) penalty of productivity compared to the high selectivity/low permeance membrane alone but a 43.3% productivity increase relative to the low selectivity/high permeance membrane alone. Example 4 shows that a dramatic reduction in total membrane surface area per unit of product flow (reduction by 60.5% compared to Comp. Ex. 1) results by making the low selectivity/high permeance membrane module area 0.14 of the total area. This is very important in mobile applications such as aircraft fuel tank blanketing utilities where limiting the size and weight of auxiliary equipment such as NEA generating apparatus is critical.

TABLE 1

|  | Comp. Ex. 1 | Comp. Ex. 2 | Ex. 3 | Ex. 4 |
| --- | --- | --- | --- | --- |
| Total Sweep flow (scfm) | 4.0 | 7.9 | 5.5 | 6.4 |
| Total Feed Air flow (scfm) | 124.0 | 245.0 | 171 | 198 |
| Low selectivity/high permeance Module area (ft²) | 0 | 820 | 326 | 517 |
| Low selectivity/high permeance Module area fraction of total | 0 | 1.00 | 0.06 | 0.14 |
| High selectivity/low permeance Module area (ft²) | 9370 | 0 | 5570 | 3190 |
| Total Membrane area (ft²) | 9370 | 820 | 5900 | 3700 |
| Total Membrane Area/unit NEA flow (ft²/scfm) | 123 | 10.7 | 77.3 | 48.5 |
| Total Membrane Area/unit NEA flow Reduction vs. High selectivity/low permeance membrane (%) | 0 | 91.2 | 37.0 | 60.5 |
| Productivity (%) | 61.5 | 31.2 | 44.7 | 38.5 |
| Lost Productivity vs. High selectivity/low permeance Membrane alone (%) | 0 | 49.4 | 27.5 | 37.5 |
| Gained Productivity vs. Low selectivity/high permeance Membrane alone (%) | 97.6 | 0 | 43.3 | 23.5 |

Comparative Examples 5 and 6 and Examples 7 and 8

Repeat Comp. Exs. 1 and 2, and Exs. 3 and 4, respectively, to simulate single step and two-step separations of ambient air except that NEA product specifications provide 96 mole % nitrogen at the same net production rate of 2.16 m³/min. (76.3 scfm). Simulation data for these examples are shown in Table 2. These examples show that introducing a relatively small amount of low selectivity/high permeance membrane area in an additional first step yields a remarkably large savings in total area. Specifically, in Ex. 7, the total membrane area reduces from 2,180 m² (23,500 ft²) of the single membrane in Comp. Ex. 5, to 1,420 m² (15,316 ft²) by incorporating as a first of two steps, 99.6 m² (1,070 ft²) of low selectivity/high permeance membrane. This result is 34.8% area savings. Similarly, in Ex. 8, incorporating 180 m² (1,940 ft²) of low selectivity/high permeance membrane reduces the total area by 60.1% to 871 m² (9,370 ft²). Although there is a penalty of productivity, calling for more feed air to process in order to obtain the production rate, the productivities are greater than occurs with a single, low selectivity/high permeance membrane alone.

TABLE 2

|  | Comp. Ex. 5 | Comp. Ex. 6 | Ex. 7 | Ex. 8 |
|---|---|---|---|---|
| Total Sweep flow (scfm) | 5.9 | 23.5 | 11.4 | 16.0 |
| Total Feed Air flow (scfm) | 183.6 | 726.0 | 353 | 495 |
| Low selectivity/high permeance Module area (ft$^2$) | 0 | 3270 | 1070 | 1940 |
| Low selectivity/high permeance Module area fraction of total | 0 | 1.00 | 0.070 | 0.206 |
| High selectivity/low permeance Module area (ft$^2$) | 23,500 |  | 14,200 | 7,440 |
| Total Membrane area (ft$^2$) | 23,500 | 3,270 | 15,300 | 9,370 |
| Total Membrane Area/unit NEA flow (ft$^2$/scfm) | 308 | 42.8 | 200 | 123 |
| Total Membrane Area/unit NEA flow Reduction vs. High selectivity/low permeance membrane (%) | 0 | 86.1 | 34.8 | 60.1 |
| Productivity (%) | 41.6 | 10.5 | 21.6 | 15.4 |
| Lost Productivity vs. High Selectivity/Low Permeance Membrane alone | 0 | 74.8 | 48.0 | 62.9 |
| Gained Productivity vs. Low selectivity/high permeance Membrane alone | 297 | 0 | 106 | 47.0 |

Examples 9-12

Two-Step Separation with High Selectivity-Low Permeance Module First

Repeat Exs. 3 and 4, respectively, except that the order of the modules is reversed. That is, the high selectivity/low permeance membrane module is the first step module and the low selectivity/high permeance membrane module is the second step module. In Exs. 9 and 10, the product specifications are to provide 90 mole % NEA at the same net production rate of 2.16 m$^3$/min. (76.3 scfm). In Exs. 11 and 12, the configuration is the same as Exs. 9, and 10, respectively, except that the product specifications provide 96 mole % NEA at the same net production rate of 2.16 m$^3$/min. (76.3 scfm). Simulation data for these examples are shown in Table 3.

Significant savings compared to Comp. Ex. 1 in total membrane area, and therefore, volume of the NEA-generating apparatus are achieved by combining membrane modules with the high selectivity-low flux module coming first in the sequence of steps. The savings improvements are not as great as for the cases in which the low selectivity/high permeance membranes are in the first step module (see Exs. 3 and 4). Thus, in Ex. 9, a 47.8 m$^2$ (514 ft$^2$) membrane area of low selectivity/high permeance equating to 8.6% of total membrane area in the second step, reduces the total membrane area of Comp. Ex 1 870 m$^2$ (9,370 ft$^2$) by 36.4% to 553 m$^2$ (5,960 ft$^2$). The productivity penalty is 40.7% compared to a single step process using a high selectivity/low permeance membrane alone.

TABLE 3

|  | Ex. 9 | Ex. 10 | Ex. 11 | Ex. 12 |
|---|---|---|---|---|
| Total Sweep flow (scfm) | 6.7 | 7.3 | 21.7 | 23.0 |
| Total Feed Air flow (scfm) | 209 | 228 | 674 | 713 |
| Low selectivity/high permeance Module area (ft$^2$) | 514 | 664 | 2650 | 2980 |
| Low selectivity/high permeance Module area fraction of total | 0.086 | 0.183 | 0.148 | 0.243 |
| High selectivity/low permeance Module area (ft$^2$) | 5,440 | 2,960 | 1510 | 9,280 |
| Total Membrane area (ft$^2$) | 5,960 | 3,630 | 17,900 | 12,300 |
| Total Membrane Area/unit NEA flow (ft$^2$/scfm) | 78.0 | 47.5 | 234 | 161 |
| Total Membrane Area/unit NEA flow Reduction vs. High selectivity/low permeance membrane (%) | 36.4 | 61.3 | 24.0 | 47.8 |
| Productivity (%) | 36.5 | 33.5 | 11.3 | 10.7 |
| Lost Productivity vs. high selectivity/low permeance Membrane alone | 40.7 | 45.5 | 72.7 | 74.2 |
| Gained Productivity vs. Low selectivity/high permeance Membrane alone | 17.3 | 7.7 | 8.0 | 2.2 |

Comparative Examples 13 and 14

Two Step Separation with Modules of Same Membrane Characteristics

Simulate generation of nitrogen enriched air (NEA) from ambient air in a two step membrane separation model according to Ex. 3 with the following changed conditions. For Comp. Ex. 13, the selectively gas permeable membrane are exclusively high oxygen-nitrogen selectivity/low oxygen permeance hollow fibers as in Ex. 3. That is, these fiber membranes are present in both modules 113 and 123. The net product NEA is 2.16 m$^3$ (76.3 scfm) of 90 mole % nitrogen. Determine that the numbers of fibers to generate the net product NEA is such that effective membrane surface area for permeation in modules 113 and 123 are 50.9 m$^2$ (548 ft$^2$) and 870 m$^2$ (9360 ft$^2$), respectively. Comp. Ex. 14 is the same as Comp. Ex. 13 except that low oxygen-nitrogen selectivity/high oxygen permeance membranes are present in both modules. Simulation of this model system determines that the number of fibers called for to obtain the product NEA provides 4.7 m$^2$ (51 ft$^2$) and 80.9 m$^2$ (871 ft$^2$), respectively, in modules 113 and 123. Complete data for these examples is presented in Table 4.

TABLE 4

|  | Comp. Ex. 13 | Comp. Ex. 14 |
|---|---|---|
| Total Sweep flow (scfm) | 4.1 | 8.4 |
| Total Feed Air flow (scfm) | 126.1 | 255.7 |
| First Module area (ft$^2$) | 548 | 51 |
| First Module area fraction of total | .06 | .06 |
| Second Module area (ft$^2$) | 9360 | 841 |
| Total Membrane area (ft$^2$) | 9910 | 922 |
| Total Membrane Area/unit NEA flow (ft$^2$/scfm) | 130 | 12.1 |
| Total Membrane Area/unit NEA flow Reduction vs. High selectivity/low permeance membrane (%) | −5.8 | 90.2 |
| Productivity (%) | 60.5 | 29.8 |
| Lost Productivity vs. High Selectivity/Low Permeance Membrane alone | 1.6 | 51.5 |
| Gained Productivity vs. Low selectivity/high permeance Membrane alone | 94.3 | −4.2 |

These comparative examples simulate the performance of Ex. 3 when all the membranes in both modules are the same composition and thus have the same oxygen-nitrogen selectivity and the same oxygen permeance. In Comp. Ex. 13, the membranes have high selectivity and low permeance. The results show that the total membrane area called for by the two membranes combined is 920 m$^2$ (9,910 ft$^2$). Additionally, the total membrane area per unit NEA flow is 426 m$^2$/standard m$^3$/min. (130 ft$^2$/scfm) and the productivity measure of converting feed air to net NEA product is 60.5%. These data are very similar to the results obtained in Comp. Ex. 1 for a single module of high selectivity-low permeance membrane fibers. The total membrane area/unit NEA flow reduction relative to the single module of high selectivity/low permeance membranes (see Comp. Ex. 2) is also similar to the data of Comp. Ex. 1. The gained productivity over the single module of low selectivity/high permeance membranes of Comp. Ex. 1 is also similar.

In Comp. Ex 14, the membranes in both modules have the same properties of low selectivity and high permeance. The results show that the total membrane area called for by the two membranes combined is 85.7 m$^2$ (922 ft$^2$). Additionally, the total membrane area per unit NEA flow is 39.6 m$^2$/standard m$^3$/min. (12.1 ft$^2$/scfm) and the productivity measure of converting feed air to net NEA product is 29.8%. These data are very similar to the results obtained in Comp. Ex. 2 for a single module of low selectivity-high permeance membrane fibers. The 90.2% total membrane area/unit NEA flow reduction relative to the single module of high selectivity/low permeance membranes (see Comp. Ex. 2) is also similar to the 91.2% value in Comp. Ex. 1. The productivity gains and losses over the single module membranes in Comp. Exs. 1 and 2 are also similar.

Comparison between Comp. Ex. 13 and Comp. Ex. 14 and results of Comp. Exs. 1 and 2 are not exact. However, these data generally stand to support that the use of two modules in sequence having the same membrane properties provides performance very close to that of a single module with the same total effective area of membrane having the same selectivity and permeance properties. Consequently there is negligible benefit in overall size or performance of the system, if any, of splitting the number of membranes of a single type between multiple modules. Moreover, it is thus seen as remarkable that utilizing just a small amount of a low selectivity/high permeance module in sequential combination with a high selectivity/low permeance module generates nitrogen enriched air in a greatly reduced size and weight system than the same high selectivity/low permeance membranes alone.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A nitrogen enriched air (NEA) production system comprising
a first gas separation module comprising a first selectively gas permeable membrane defining a first feed-retentate chamber on one side of the first membrane and a first permeate chamber on a side of the first membrane opposite the first feed retentate chamber, the first membrane having an oxygen/nitrogen selectivity, $\alpha_1$, greater than 1.0, and an oxygen permeance $f_1$,
a second gas separation module comprising a second selectively gas permeable membrane defining a second feed-retentate chamber on one side of the second membrane and a second permeate chamber on a side of the second membrane opposite the second feed retentate chamber, the second membrane having an oxygen/nitrogen selectivity, $\alpha_2$, greater than 1.0, and an oxygen permeance $f_2$, and
a transfer line capable of feeding a gas from the first feed-retentate chamber to the second feed-retentate chamber and
in which $\alpha_2$ is greater than $\alpha_1$, and $f_1$ is greater than $f_2$.

2. The NEA production system of claim 1 in which $\alpha_2$ is at least about 10% more than $\alpha_1$ and in $f_1$ is at least about 10% more than $f_2$.

3. The NEA production system of claim 1 in which no compressor is present in the transfer line between the first feed-retentate chamber of the first gas separation module and the second feed-retentate chamber of the second gas separation module.

4. The NEA production system of claim 1 in which the permeate chamber of the first gas separation module is in gaseous communication with the permeate chamber of the second gas separation module.

5. The system of claim 1 which further comprises a tank containing a volatile combustible liquid and a vapor in equilibrium with the liquid, and in which one of the gas separation modules is in gaseous communication with the vapor in the tank.

6. The system of claim 5 which is a component of a motor vehicle selected from the group consisting of aircraft, automotive vehicle, and marine vessel.

7. The system of claim 5 which is a component of a utility selected from the group consisting of an offshore natural resource recovery drilling platform, an onshore natural resource recovery facility, an oil production facility, a natural gas production facility, a food processing facility, a beverage processing facility and an industrial chemical production facility.

\* \* \* \* \*